United States Patent [19]

Connor et al.

[11] Patent Number: 5,196,124

[45] Date of Patent: Mar. 23, 1993

[54] METHOD OF CONTROLLING THE PRODUCTION OF RADIOACTIVE MATERIALS FROM A SUBTERRANEAN RESERVOIR

[75] Inventors: John A. Connor; Dennis A. Clifford, both of Houston, Tex.; Philip T. King, Anchorage, Ak.

[73] Assignee: Groundwater Services, Inc., Houston, Tex.

[21] Appl. No.: 866,341

[22] Filed: Apr. 9, 1992

[51] Int. Cl.$^5$ .............................................. C02F 1/28
[52] U.S. Cl. .................................. 210/679; 210/682; 210/717; 210/747
[58] Field of Search ................ 210/679, 682, 717, 747

[56] References Cited

U.S. PATENT DOCUMENTS

| | | | |
|---|---|---|---|
| 3,136,715 | 6/1964 | Ames et al. | 210/51 |
| 3,449,065 | 6/1969 | Kremer | 23/22 |
| 3,703,208 | 11/1972 | Heckman et al. | 166/247 |
| 3,896,045 | 7/1975 | Peeters et al. | 252/301.1 W |
| 4,054,320 | 10/1977 | Learmont | 299/4 |
| 4,636,367 | 1/1987 | Huck et al. | 423/12 |
| 4,664,809 | 5/1987 | Fenton et al. | 210/663 |
| 4,804,498 | 2/1989 | Mizuno et al. | 252/628 |

OTHER PUBLICATIONS

S. Subramonian et al., "Evaluating Ion Exchange for Removing Radium From Groundwater," Research & Technology, pp. 61-70 (May 1990).
D. Clifford, "Radium Removal From Water Using Softeners and Point-of-Use Devices," Technical Papers presented at Water Quality Assoc. Annual Convention, pp. 37-62 (Mar. 1989).
D. Clifford, "Removal of Radium from Drinking Water," Radon in Drinking Water, Chapter 16, pp. 225-247 (date unknown, edited by C. R. Cothern et al.).
D. Clifford, "Radon, Radium an Uranium in Drinking Water," pp. 234-238 (1990, edited by C. R. Cothern et al.).
Philip T. King, et al., Discussion of Irena Cech, et al, article "Radon Distributrion in Domestic Water of Texas," Ground Water Journal, vol. 27, No. 3, pp. 403-407 (May-Jun. 1989).
D. Clifford et al., "Evaluating Various Absorbents and Membranes for Removing Radium From Groundwater", Research & Technology, pp. 94-104 (Jul. 1988).
V. L. Snoeyink, et al., "Barium and Radium in Water Treatment Plant Wastes," EPA R&D Project Summary EPA/600/S2-85/006 (Mar. 1985).
R. J. Elsinger, et al., "Radium-224 in Natural Waters Measured by $\gamma$-Ray Spectrometry," Analytica Chimica Acta, 144 pp. 277-281 (1982).
J. Michel et al., "$^{228}$RA and $^{226}$Ra in Drinking Water: A New Technique Using Gamma-Ray Spectroscopy and Results from South Carolina," Isotope Studies of Hydrologic Processes, Dept. of Geology Univ. So. Carolina, pp. 83-90 (no date).

(List continued on next page.)

Primary Examiner—Ivars Cintins
Attorney, Agent, or Firm—Pravel, Gambrell, Hewitt, Kimball & Krieger

[57] ABSTRACT

A method is provided for reducing the radioactive material content of fluids withdrawn from subterranean reservoirs. The method involves deposition of sorbent solids within the reservoir matrix surrounding a production well to act as an in-situ filter for dissolved radionuclides present in reservoir pore waters. For this purpose, the sorbent solid is either a) precipitated within the reservoir matrix by the reaction of two or more carrier solutions or b) directly introduced into the reservoir as a solid component of a solid-liquid slurry using high-pressure injection techniques. Thereafter, fluids produced by the well contain significantly lower concentrations of radionuclides (e.g., principally radium and uranium ions), as radionuclides are removed from the inflowing reservoir fluids by means of ion exchange, adsorption, chelation, chemisorption, or coprecipitation with the in-situ filter medium.

17 Claims, 1 Drawing Sheet

OTHER PUBLICATIONS

Rama et al., "Mechanism of transport of U-Th series radioisotopes from solids into ground water," Geochimica et Cosmochimica Acta vol. 48, pp. 395–399 (1984).

P. T. King et al., "Ground water geochemistry of $^{228}$Ra, $^{226}$Ra and $^{222}$Rn," Geochimica et Cosmochimica Acta, vol. 46, pp. 1173–1182 (1982).

J. Michel, "γ-Ray Spectrometry for Determination of Radium-228 and Radium-226 in Natural Waters," Anal. Chem. 53, pp. 1885–1889 (1981).

J. S. Nathwani et al., "Adsorption of $^{226}$Ra of Soils (I)," Chemosphere No. 5, pp. 285–291 (1979).

T. W. Healy, et al., "The Effect of Crystal Structure on the Surface Properties of a Series of Manganese Dioxides," Jnl of Colloid and Interface Science 21, pp. 435–444 (1966).

R. L. Valentine, et al., "Removing Radium by Adding Preformed Hydrous Manganese Oxides," Research & Technology, pp. 66–71 (Feb. 1990).

V. L. Snoeyink, et al., "Strong-Acid Ion Exchange for Removing Barium, Radium, and Hardness," Research & Technology pp. 66–72 (Aug. 1987).

N. A. Hahn Jr., "Disposal of Radium Removed From Drinking Water," Research & Technology pp. 71–78 (Jul. 1988).

J. P. Longtin, "Occurrence of Radon, Radium, and Uranium in Groundwater," Research & Technology, pp. 84–93 (Jul. 1988).

A. G. Myers, et al., "Removing Barium and Radium Through Calcium Cation Exchange," Research & Technology, pp. 60–66 (no date).

ASTM Designation: D2434–68, "Standard Test Method for Permeability of Granular Soils"(Constant Head), pp. 285–289 (Reapproved 1974).

Rahul Patel, et al., "Radium Removal From Water By Manganese Dioxide Adsorption and Diatomaceous Earth Filtration," 21 pages, Cooperative Research Agreement No. CR-813148, Submitted to Office of Research & Development, U.S. EPA (Oct. 18, 1991).

Deepak Garg, et al., "Removal of Radium from Water by Adsorption onto Barium Sulfate Impregnated and Plain Activated Alumina," 19 pages, Cooperative Research Agreement No. CR-812148, Submitted to Office of Research & Development, U.S. EPA (Feb. 24, 1992).

5,196,124

METHOD OF CONTROLLING THE PRODUCTION OF RADIOACTIVE MATERIALS FROM A SUBTERRANEAN RESERVOIR

BACKGROUND OF THE INVENTION

1. Field of the Invention

The invention relates to a method for reducing the radioactive material content of fluids withdrawn from subterranean reservoirs or "aquifers" by means of wells.

2. Description of the Prior Art

Naturally-occurring radioactive materials (NORM) are present at varying concentrations in groundwater produced from water supply wells, oil production wells, and gas production wells. In addition, radioactive materials have been artificially introduced into groundwater reservoirs due to leaching or spills associated with radioactive waste disposal, testing, and mining activities. Production of fluids containing radioactive materials poses both health-related and environmental problems. The invention provides a new method of reducing the production of such radioactive materials from wells.

Radioactive materials contained in fluids produced from subterranean reservoirs can pose a significant risk to human health and the environment. Due to toxic and carcinogenic effects, strict health-based limits have been established for human exposure to radium, radon, and other naturally-occurring radionuclides. However, within fluids produced from water, oil, or gas production wells, radioactive material concentrations significantly exceeding acceptable levels are not uncommon. In addition to human exposure, production of such radioactive fluids can contaminate distribution piping and equipment and the environment.

Various water treatment technologies have been shown capable of removing radionuclides from produced fluids; however, such treatment facilities invariably involve generation of a concentrated radioactive waste residue, presenting a significant waste management and disposal problem.

The following prior art patents are directed, generally, to the removal of dissolved contaminants from produced potable groundwater: U.S. Pat. Nos. 3,136,715; 3,449,065; 3,803,208; 3,896,045; 4,054,320; 4,636,367; 4,664,809; 4,804,498.

U.S. Pat. No. 4,664,809, entitled "Groundwater Pollution Abatement" is directed to a method for pollution abatement in groundwaters whereby a series of wells are drilled in the path of the advancing front of contaminants in an aquifer. A particulate absorbent material, such as activated carbon, treated clay, inorganic oxides, silicates, alumino silicates, carbonaceous materials, organic-polymers, and the like is introduced through the wells. While such procedure may treat potable water in the aquifer for various pollutants, these methods are not, however, adequate for removal of radioactive materials from such potable water aquifers.

U.S. Pat. No. 4,054,320, entitled "Method for the Removal of Radioactive Waste During In-Situ Leaching of Uranium" is directed to a leaching process in mining operations wherein a "pre-pack" of sand or other particulate matter is placed around the exterior of the wellscreen of the well through which the leaching water is produced. The sand, or other particulate matter comprising the pre-pack, has deposited thereon a barium-containing ion exchange material designed to extract and concentrate the dissolved uranium contained in the produced waters.

The '320 patent's method may reduce the radionuclide content of produced waters to some degree but poses significant disadvantages relative to the present invention. First, due to the limited sorbent mass provided by the sand "pre-pack", the sorbent capacity of this medium would be consumed in a relatively short period, requiring redrilling of the well and replacement and disposal of the "pre-pack" material. Secondly, the "pre-pack" provides a relatively small surface area for contact with produced fluids. Therefore, radionuclide removal efficiencies would be less than those achieved by a larger in-situ zone that filters out or traps radionuclides in place. Finally, this prior method is intended for use in extraction of uranium ions from leaching fluids used in uranium mining operations, whereas the invention is directed to removing lower levels of radionuclides of concern from water supply wells, oil production wells, or gas production wells.

What is yet needed is a method for treating produced fluids for the removal of radionuclides, including radium and uranium, that is simple, relatively inexpensive, and does not generate a radioactive waste product that poses disposal problems.

SUMMARY OF THE INVENTION

The present invention provides a simple, inexpensive method for removing or significantly reducing the radioactive material content of subterranean reservoir fluids prior to entry into the production well. The invention method retains radionuclides within the subsurface by means of an in-situ radionuclide "filter" or "trap" deposited within the reservoir matrix surrounding the well. Consequently, the radioactive material concentrations in the reservoir fluids produced at ground surface are significantly reduced, providing significant benefits in terms of reduced risk of human exposure or environmental contaminaton. Specifically, for water supply wells, subsurface removal of radionuclides provides a useable water resource while avoiding the problem of radioacitve waste generation commonly associated with water treatment technologies. For oil and gas production wells, the present invention provides a means for reducing radioactive scale formation on distribution piping and equipment and for mitigating environmental contamination associated with brine storage and disposal. In addition, the rate of radon gas emanation from produced waters is reduced due to the reduced concentration of dissolved radium present in the production fluid.

Conceptually, the invention is directed to the in-situ treatment of subterranean fluids for the removal of trace contaminants. Therefore, the techniques described herein may be utilized, using different scavenging chemical reactants, to remove trace contaminants other than radionuclides from subterranean fluids by an in-situ treatment process which involves injecting the scavenging chemical into the subterranean reservoir for removal of contaminants.

The invention involves placement of a sorbent solid within the reservoir matrix to act as an "in-situ filter" for dissolved radionuclides present in the reservoir (or aquifer) fluids. For this purpose, the sorbent solid is supplied in one of two embodiments; it is either a) precipitated within the reservoir matrix by the reaction of two or more carrier solutions or b) directly introduced into the reservoir as a solid phase component of a solid-liquid slurry using high-pressure injection techniques.

In the first embodiment, a carrier solution, containing a dissolved component of the sorbent material, is introduced into the reservoir zone surrounding the production well via the production well itself or one or more injection wells. An adequate volume of carrier solution is introduced to ensure contact of the carrier solution with reservoir matrix solids over a predetermined area. Thereafter, the second (and subsequent) carrier solution(s) is (are) introduced, containing appropriate dissolved components to cause precipitation of the sorbent solid within the reservoir matrix. Following such precipitation, excess carrier fluids are removed from the reservoir. The precipitated sorbent solids remain in place in the reservoir matrix to serve as an in-situ filter or trap for dissolved radionuclides contained in the reservoir fluids flowing into the production well. This filtration or trapping effect is due to ion exchange, adsorption, chelation, chemisorption, or coprecipitation of the radionuclides onto the precipitated sorbent solid.

In the second embodiment, the sorbent solid is directly introduced into the reservoir matrix as a solid component of a slurry. For this purpose, the sorbent solid and/or sand-sized particles to which the sorbent solid has been either added or affixed are combined with an appropriate injection fluid, and subsequently introduced into the reservoir via the production well itself or one or more injection wells, using conventional high-pressure injection or "hydraulic fracturing" techniques. By this hydraulic fracturing process, secondary porosity features (e.g., fractures, fissures, partings, etc.) in the reservoir zone surrounding the well are expanded and partially infilled with the injected solids or "proppants", which serve to preserve the induced fracture structure following relief of injection pressure. Following such fracture treatment, the excess injection fluid is removed from the reservoir. However, the sorbent solid remains in place in the fracture zone, to serve as an in-situ filter or trap for dissolved radionuclides contained in reservoir fluids flowing toward the production well. This filtration or trapping effect is due to ion exchange, adsorption, chelation, chemisorption, or coprecipitation of the radionuclides onto the sorbent solid.

The invention is applicable to a broad variety of reservoir conditions and well operating schemes. In-situ precipitation of the sorbent solid can be best applied within reservoirs containing fresh to moderately saline groundwater, such as those which are commonly exploited for water supply purposes. Within oil or gas production reservoirs containing complex, highly reducing aqueous solutions, direct injection of the sorbent solid using hydraulic fracturing techniques provides practical advantages. At a given well site, the chemical composition, concentration, and dimension of the in-situ filter or trap can be adjusted to achieve radionuclide removal for an extended time period. Following eventual saturation of the sorbent solid with radionuclides, the in-situ radionuclide filter can be reformed by repeating the initial treatment process.

DESCRIPTION OF THE PREFERRED EMBODIMENTS

1. General Method and Applicability

Figure 1:
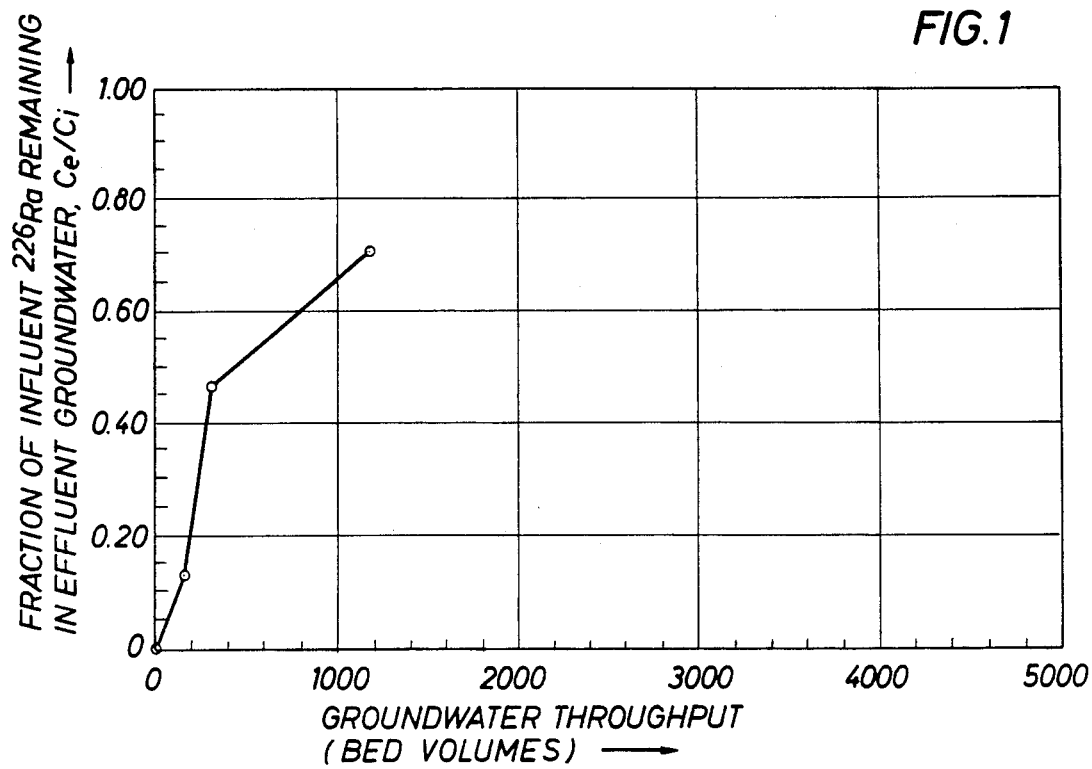
FIG. 1 is a graph showing the filtration performance of untreated sand in removing dissolved radionuclides from groundwater.

The invention provides a means of reducing the radioactive material content of fluids produced from subterranean reservoirs (or "aquifers") by means of wells. Naturally-occurring radioactive materials (NORM) have been found to be present at concentrations exceeding health-based standards in groundwater produced by water supply wells, oil production wells, and gas production wells. In addition, radioactive materials have been artificially introduced into groundwater reservoirs due to leaching or spills associated with radioactive waste disposal, testing, and mining activities, resulting in contamination of drinking water resources. To address these problems, the invention involves placement of "sorbent solids" within the reservoir matrix to act as an "in-situ radionuclide filter or trap" for dissolved radionuclides present in the reservoir fluids. Radionuclides flowing past the in-situ filter are removed by means of ion exchange, adsorption, chelation, chemisorption, or coprecipitation onto the sorbent solids, resulting in a significant reduction in the radioactive material content of the fluids produced from the treated well. Various sorbent solids have been identified which can be effectively deposited within the reservoir matrix and which serve as efficient scavengers for radium or uranium, the predominant radioactive ions within natural reservoir pore waters.

For the purpose of the present discussion, the term "sorbent solid" is intended to comprehend a solid material that effects the removal of dissolved radionuclides from reservoir fluids by ion exchange, adsorption, chelation, coprecipitation, chemisorption, or other physiochemical mechanism. This effect is herein referred to as "in-situ filtration" or "trapping" of the dissolved radionuclides within the reservoir matrix.

2. Detailed Description of the Method

To establish an in-situ filter for radioactive ions present within the reservoir fluids, the invention provides two alternate procedures for placement of a sorbent solid within the reservoir matrix surrounding a production well. In the first embodiment of the invention process, the sorbent solid is precipitated within the reservoir matrix by the reaction of two or more carrier solutions. Alternatively, the sorbent solid may be directly introduced into the reservoir matrix as a solid component of a solid and liquid slurry. Further description of these alternate embodiments, as well as the critical characteristics of the sorbent solids and injection fluids, is provided below.

First Embodiment: In-Situ Precipitation of Sorbent Solid

For the purpose of in-situ precipitation of the sorbent solid, two or more carrier solutions are prepared containing complementary components of the sorbent compound, which, upon mixing, result in precipitation of the sorbent solid. In a typical application, the first of these carrier solutions is introduced into the reservoir zone surrounding the screened or perforated portion of the production well by either 1) directly injecting the solution down through the casing of the production well, using appropriate packers, injection tubing, and pumps, as needed, or 2) injecting the solution into the reservoir by means of one or more injection wells appropriately located with respect to the production well requiring treatment. An adequate volume of this first carrier solution is introduced to permeate the desired portion of the reservoir matrix surrounding the production well. Following such injection, the injection equipment and piping is purged using clean water, and the second (and subsequent) carrier solution(s) is (are) then injected in a sufficient quantity to achieve precipitation of the sorbent solid over the full portion of the reservoir matrix permeated by the first carrier solution. Following a time period sufficient for precipitation and/or crystallization of the sorbent solid within the reservoir matrix, any excess carrier solutions that may remain within the reservoir are removed by pumping of the production well. This treatment cycle may be repeated as needed to establish the desired mass and distribution of the sorbent solid within the reservoir matrix or to extend the functional life of the in-situ radionuclide filter medium.

Alternative Embodiment: Direct Injection of Sorbent Solid

In an alternate approach, the sorbent solid is directly introduced into the reservoir matrix as a solid component of a slurry. For this purpose, the sorbent solid is either 1) prepared as sand-sized or smaller particles, 2) affixed to or intermixed with particles of sand, ceramics, or other such proppant materials appropriate to hydraulic fracturing applications, or 3) chemically bonded to such proppant materials to functionalize the proppant material surface for radionuclide removal from the reservoir fluids. The prepared solids are subsequently combined with an injection fluid in appropriate proportions and by such means as to provide a slurry suitable for injection into the reservoir using conventional hydraulic fracturing techniques. In a typical application, the sorbent solid is introduced into the reservoir zone surrounding the screened, perforated, or uncased portion of the production well by injecting the slurry down through the casing of the production well using appropriate packers, injection tubing, high-pressure pumps, and ancillary equipment.

The hydraulic fracturing process involves application of an injection pressure sufficient to enhance the secondary porosity features (e.g., fractures, fissures, partings, etc.) of the reservoir matrix surrounding the well. The injected proppant solids partially infill these induced fractures, serving to maintain an enhanced secondary porosity within the reservoir matrix following relief of injection pressures. In the current application, sufficient injection pressure is applied and an adequate volume of the slurry introduced so as to permeate the desired portion of the reservoir matrix surrounding the production well.

Following such fracture treatment, excess injection fluid is removed from the reservoir; however, the sorbent solid remains in place within the induced fracture zone, comprising an in-situ filter or trap for dissolved radionuclides contained in reservoir fluids flowing toward the well. This treatment cycle may be repeated as needed to establish the desired mass and distribution of the sorbent solid within the reservoir matrix or extend the functional life of the in-situ radionuclide filter medium.

Characteristics of Sorbent Solid

Sorbent solids utilized by this either embodiment of invention may be any compound or combination of compounds that serve as an efficient scavenger for dissolved radionuclides, either by ion exchange, chelation, adsorption, chemisorption, or coprecipitation. Further, it is desirable that the scavenger may be precipitated as a stable solid from aqueous solutions containing dissolved components of the compound in a subterranean environment. Alternatively, the scavenging agent must be capable of direct injection into a subterranean environment, either as a stable solid component of a solid-liquid slurry or in a form wherein it is chemically attached to a solid proppant surface to functionalize the surface of that solid proppant for radionuclide removal. Such compounds include but are not limited to manganese dioxide, barium sulfate, barium carbonate, iron oxide, iron hydroxide, aluminum hydroxide, as well as phosphates of zirconium and calcium, and oxides of zirconium, titanium, antimony, and tin. Crown ethers, and the like, may be chemically bonded to the surface of a proppant for injection into a reservoir. The sorbent solid deposited within the reservoir matrix surrounding a given production well may be composed of one or more such compounds, as required to remove the principal radionuclides present within the local reservoir fluids.

To facilitate in-situ precipitation of the sorbent solid (as described by the first embodiment above), carrier solutions must be devised to segregate two or more water-soluble components of the sorbent compound, which, upon mixing, precipitate the compound. Such solutions can be readily devised by persons of ordinary skill in the art. Carrier solutions which have been demonstrated for this purpose include: barium chloride and sodium sulfate solutions for deposition of barium sulfate; or potassium permanganate and manganese sulfate solutions for deposition of manganese dioxide.

In general, given the trace-level mass concentrations of dissolved radionuclides commonly present in reservoir fluid, a relatively small mass of sorbent solid dispersed within the reservoir matrix will suffice to achieve a significant reduction in the radioactive material content of fluids flowing through the treated reservoir zone. The composition of the carrier solutions (first embodiment) or solid-liquid slurries (alternative embodiment) must be established on a case-by-case basis to deposit an appropriate mass of sorbent solid within the reservoir matrix, as may be determined by persons of ordinary skill in the art.

Characteristics of Injection Fluid

The fluid used for preparation of carrier solutions (first embodiment) or solid-liquid injection slurries (alternative embodiment) may be any liquid which facilitates the deposition of the sorbent solid within the reservoir matrix without adversely affecting fluids to be produced from the well. Most commonly, fresh water, saline water, or brines available at the site of the production well will be employed for this purpose. For the first embodiment, the injection fluid must be capable of dissolving the components of the sorbent compounds at the concentrations required for precipitation of the necessary mass of sorbent solid within the reservoir. For the second embodiment, the injection fluid may be augmented with various additives serving to enhance the hydraulic fracturing process.

Relevant Reservoir Properties

The optimal procedure for deposition of the sorbent solid within the reservoir will depend upon the chemical and physical characteristics of the reservoir pore fluids and solid matrix. In-situ precipitation of the sorbent solid (first embodiment) can best be applied within reservoirs containing fresh to moderately saline groundwater, such as those which are commonly exploited for water supply purposes. Within oil or gas production reservoirs containing complex, highly reducing aqueous solutions and/or multiphase fluids, direct injection of the sorbent solids (second embodiment) using hydraulic fracturing techniques can provide practical advantages in terms of the distribution and stability of the sorbent solid within the reservoir matrix.

Subterranean reservoirs or "aquifers" exploited for production of water, oil, or gas often consist of sand or sandstone deposits with sufficient effective porosity to store and transmit fluids or gasses. In such reservoirs, the reservoir solid matrix is composed primarily of silica sand particles intermixed with varying concentrations of silt, clay, and other minerals. The sorbent solids deposited within such reservoirs by the in-situ precipitation method of the first embodiment are most likely retained by adsorption to the clay mineral fraction of reservoir matrix, as well as direct adsorption to the surface of the sand particles. In reservoirs consisting of fractured granite, basalt, dolomite, limestone, or other rocks, the carrier solutions can be expected to permeate the fracture network of the reservoir, resulting in direct precipitation and adsorption of the sorbent solids onto the rock surface or onto minerals previously deposited within the fracture network.

Sorbent solids introduced by means of direct injection (alternative embodiment) are retained within the existing and induced fracture network of such reservoirs as a component of the solid proppant media deposited during the hydraulic fracturing process.

It is important to note that, due to the low mass concentrations of radionuclides commonly present in reservoir pore fluids and the high sorbent capacity of the selected in-situ filter materials, a relatively small mass of sorbent solids dispersed within the reservoir pore space will suffice to achieve a significant reduction in the radionuclide content of fluids flowing through the treated reservoir zone. For example, manganese dioxide concentrations of 1 to 2 g/kg within the reservoir matrix will comprise an effective in-situ filter for dissolved radionuclides. At such minor concentrations, the deposited sorbent solids do not measurably alter the effective porosity of the reservoir matrix or significantly diminish the hydraulic yield of the production well.

Example of Method Application

For a 1 ft diameter water production well with a 100 ft length of screened section, in-situ precipitation of a manganese dioxide filter medium would involve several steps. First, a carrier solution having an 18 g/l concentration of manganese sulfate dissolved in water would be injected into the well casing in a manner causing the solution to flow out through the well screen and into the surrounding reservoir. A fluid volume of approximately 360,000 gallons would be injected into the reservoir in order to permeate the reservoir within a 23-ft radius surrounding the well bore over the 100 ft length of the screened section. Fresh water would then be pumped through the injection piping to flush the system of the carrier solution and minimize subsequent precipitation of sorbent solids within the injection piping or wellbore. Next, a 360,000-gallon volume of the second carrier solution, consisting of a 12.6 g/l solution of potassium permanganate dissolved in water, would be injected through the well casing to contact the first carrier solution and result in the precipitation of solid manganese dioxide at a bulk concentration of approximately 2 g/kg within the reservior matrix over a 23 ft radius surrounding the well. If necessary, the efficient mixing of the carrier solutions and resultant deposition of the in-situ filter medium can be enhanced by introducing the carrier solutions in a cyclic manner, alternating small quantities of the two solutions each followed by a fresh water flush of the injection lines, until a sufficient fluid quantity has been injected to treat the reservoir over the desired radial distance surrounding the production well.

In a sand reservoir in which the pore fluids contained a dissolved radium ion content of 25 pCi/l, deposition of manganese dioxide, as described in the above example, would provide an in-situ filter capable of removing radium from billions of gallons of water produced from the well. Following saturation of the sorbent solid with radium ions or other radionuclides, the in-situ filter could be readily reformed by repeating the initial treatment process.

3. Demonstration of the Method

The effectiveness of the method provided by the present invention has been demonstrated by laboratory procedures that simulate the environment of a subterranean reservoir or "aquifer." For this purpose, glass columns were packed with a natural reservoir material, such as sand; treated to deposit an appropriate sorbent solid within this reservoir matrix by means of in-situ precipitation; and subsequently contacted with water containing dissolved radioactive materials to test the performance of the in-situ filter. A summary of the procedures and results of this laboratory demonstration is provided below.

For the purpose of this laboratory program, groundwater with an average $^{226}$Ra (radium) concentration of 23 pCi/L was obtained from an out-of-service water supply well located in the Chimney Hill subdivision in Houston, Tex. A series of soil column studies was conducted to evaluate the performance of a sorbent-treated reservoir sand as an in-situ filter of dissolved radium from these reservoir pore waters. A glass column was loaded with a natural silty sand soil in accordance with procedures specified under ASTM Method No. D2434, treated to deposit a radionuclide-sorbent material (i.e., manganese dioxide) by means of in-situ precipitation, and subsequently rinsed with groundwater containing naturally-occurring radium. As an experimental control, a second glass column was loaded with the same sand soil but was not treated by the invention method prior to filtration of groundwater.

The soil columns employed in this demonstration consisted of glass columns approximately 1 inch in diameter and 2 feet in length and loaded with approximately 300 ml of sand. After loading, the sand-filled columns were placed under a vacuum and backwashed with approximately 3 bed volumes of deionized water to evenly saturate the sand matrix, remove air bubbles, and remove loose soil fines. One of the soil columns was retained as a control while manganese dioxide was deposited in the other column. In order to deposit the manganese dioxide, the column was alternately rinsed with 30 ml of 0.12 molar concentration manganese sulfate, followed by 30 ml of deionized water, followed by 30 ml of 0.08 molar concentration potassium permanganate. After 500 ml of each of manganese sulfate and potassium permanganate had been washed through the column at an average flow rate of about 30 ml per minute, the sequence was stopped. The reactants produced a clearly-visible black manganese dioxide precipitate on the sand.

A sample of Chimney Hill groundwater was then passed through the treated sand filter at a fluid velocity of 1.5 cm/sec while effluent samples were collected every 2 hours for the first 10 hours, every 12 hours through day 2, daily thereafter through day 7, and every alternate day until termination of the 45-day test period. Similarly, groundwater was passed through the untreated column and effluent samples were collected for analysis for a period of 3 days.

Column effluent fluids were analyzed to compare the radium removal efficiencies achieved by the treated sand column to that achieved by the untreated sand. For this purpose, dissolved $^{226}Ra$ concentrations in the groundwater effluent samples were analyzed in accordance with EPA Method No. 900.1, using a scintillator detection system.

Figure 2:
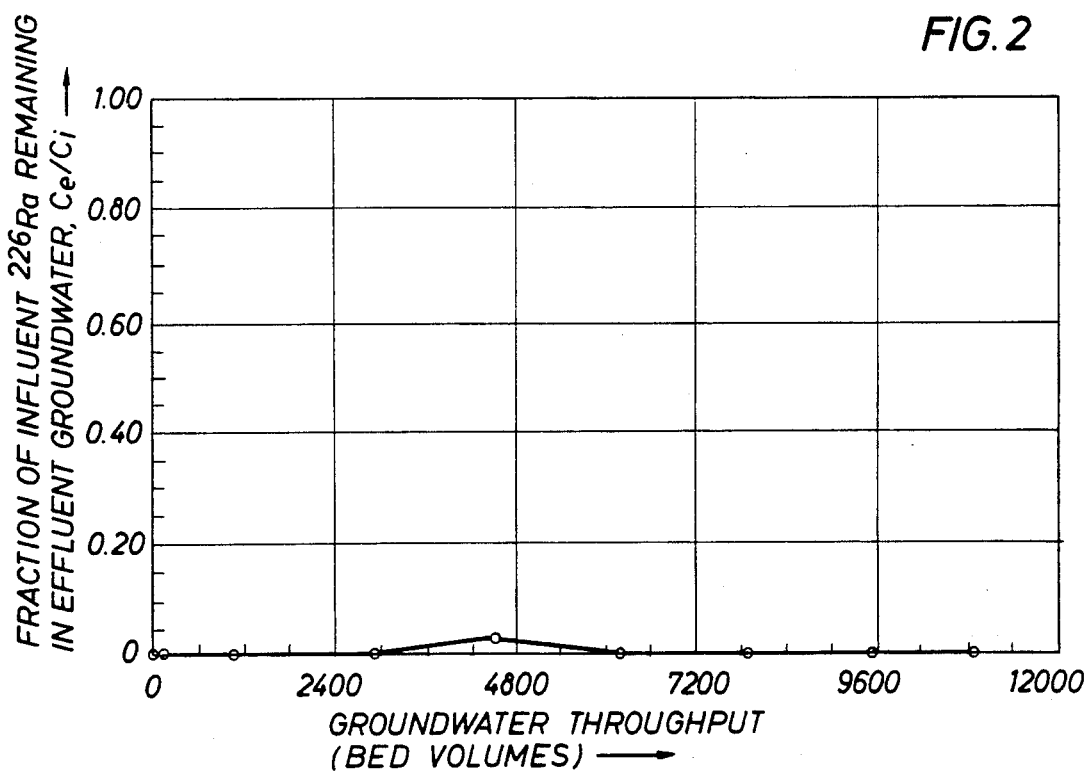
FIG. 2 is a graph showing the radionuclide filtration performance of sand treated by the invention method.

The concentrations of $^{226}Ra$ measured in groundwater effluent from the untreated and treated sand columns are plotted on FIGS. 1 and 2, respectively. As shown, the $^{226}Ra$ concentration in groundwater effluent from the untreated column reached a value equal to approximately 75% of the influent radium concentration after 1200 bed volumes of the radionuclide-containing groundwater had been passed through the column. In contrast, the radium concentration in the effluent of the $MnO_2$-treated column was still non-detectable after over 11,000 bed volumes (BV) of groundwater had been passed through the column. For a production well, this 11,000 BV capacity of the $MnO_2$-treated reservoir zone would provide radium removal from of a very large volume of water prior to radium breakthrough. For example, in the case of a well with a 100 ft screen length treated over a 25 ft radius surrounding the well, the $MnO_2$-treated reservoir zone would reduce radium concentrations to non-detectable levels in over 4 billion gallons of produced fluids.

In this test program, deposition of solid $MnO_2$ within a reservoir matrix was shown to establish an effective filter for dissolved $^{226}Ra$ contained in groundwater passing through the treated reservoir zone.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications which can be made without departing from the spirit of the invention as described above are within the scope of the invention claimed herebelow.

We claim:

1. A method for reducing the dissolved radionuclide content of fluids withdrawn from subterranean reservoirs comprising:
    (a) introducing a first carrier solution, comprising a dissolved component of a solid scavenger for dissolved radionuclides found in reservoir fluids, into a reservoir in the area surrounding a production well, the quantity and concentration of the carrier solution being sufficient to ensure deposition of a mass of sorbent solid, sufficient to reduce the dissolved radionuclide content of withdrawn fluids, over a predetermined area when ions are precipitated from the carrier solution;
    (b) introducing a second carrier solution, comprising a complementary component of a solid scavenger for soluble radionuclides, into the reservoir area to commingle with the ions of the first carrier solution;
    (c) reacting the dissolved component of the first carrier solution and the complementary component of the second carrier solution to precipitate a solid scavenger able to remove dissolved radionuclides from fluids in the reservoir when the fluids contact the precipitated solid, and
    (d) allowing the solid scavenger to contact fluids containing dissolved radionuclides in the reservoir to remove dissolved radionuclides from the fluids.

2. The method of claim 1 wherein the reservoir fluids comprise fresh or saline water.

3. The method of claim 1 wherein the reservoir fluids comprise water and fluid hydrocarbons.

4. The method of claim 1 wherein the reservoir fluids comprise brine fluids in a geothermal reservoir.

5. The method of claim 1 wherein the introducing of carrier solutions is via the production well.

6. The method of claim 1 wherein the introducing of carrier solutions is via at least one injection well.

7. The method of claim 1 wherein the sorbent solid is selected from the group consisting of manganese dioxide, barium sulfate, barium carbonate, aluminum hydroxide, iron oxide, iron hydroxide, the phosphates of zirconium and calcium, and the oxides of zirconium, titanium, antimony, and tin.

8. A method for reducing the dissolved radionuclide content of fluids withdrawn from subterranean reservoirs, said method comprising:
    a) injecting a slurry comprising solids and liquid, said solids comprising a sorbent for radionuclides and a proppant material for supporting secondary fractures caused by hydraulic fracturing, into a reservoir zone surrounding a production well;
    b) pressurizing the injected slurry to distribute the injected solids in the secondary fractures over a predetermined area surrounding the production well; and
    c) contacting the injected sorbent solids with dissolved radionuclide-containing fluids to be withdrawn from the reservoir zone to remove dissolved radionuclides from the fluids.

9. The method of claim 8 wherein the reservoir fluids comprise fresh or saline water.

10. The method of claim 8 wherein the reservoir fluids comprise water and fluid hydrocarbons.

11. The method of claim 8 wherein the reservoir fluids comprise brine fluids in a geothermal reservoir.

12. The method of claim 8 wherein the injecting of the slurry is via at least one production well.

13. The method of claim 8 wherein the injecting of the slurry is via at least one injection well.

14. The method of claim 8 wherein the sorbent solid is selected from the group consisting of manganese dioxide, barium sulfate, barium carbonate, aluminum hydroxide, iron oxide, iron hydroxide, the phosphates of zirconium and calcium, and the oxides of zirconium, titanium, antimony, and tin.

15. The method of claim 8 wherein the sorbent solid comprises a radionuclide-selective functional group and the sorbent solid is chemically attached to the surface of the proppant solid for the purposes of trapping dissolved radionuclides by means of ion exchange, chelation, adsorption, chemisorption, or coprecipitation.

16. The method of claim 8 wherein the proppant material comprises proppants having a surface functionalized by attachment thereto of a chemical capable of trapping dissolved radionuclides by means of ion exchange, chelation, adsorption, chemisorption, or coprecipitation.

17. The method of claim 16 wherein the surface of the proppant is functionalized with a crown ether.

* * * * *